United States Patent
Erle et al.

(10) Patent No.: US 8,577,952 B2
(45) Date of Patent: Nov. 5, 2013

(54) COMBINED BINARY/DECIMAL FIXED-POINT MULTIPLIER AND METHOD

(75) Inventors: Mark Alan Erle, Macungie, PA (US);
Brian John Hickmann, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 12/329,686

(22) Filed: Dec. 8, 2008

(65) Prior Publication Data
US 2010/0146030 A1    Jun. 10, 2010

(51) Int. Cl.
*G06F 7/492* (2006.01)

(52) U.S. Cl.
USPC ........................................................ 708/624

(58) Field of Classification Search
None
See application file for complete search history.

(56) References Cited

U.S. PATENT DOCUMENTS

| | | | |
|---|---|---|---|
| 4,677,583 A | 6/1987 | Ohtsuki et al. | |
| 6,065,033 A | 5/2000 | Jouppi | |
| 6,421,699 B1 | 7/2002 | Dhong et al. | |
| 6,711,633 B2 | 3/2004 | Bradley et al. | |
| 7,136,893 B2 | 11/2006 | Carlough et al. | |
| 7,266,580 B2 | 9/2007 | Busaba et al. | |
| 7,373,368 B1 | 5/2008 | Rarick et al. | |
| 2006/0212499 A1 | 9/2006 | New et al. | |
| 2010/0146030 A1* | 6/2010 | Erle et al. | 708/624 |
| 2010/0146031 A1* | 6/2010 | Erle et al. | 708/683 |
| 2011/0131266 A1* | 6/2011 | Carlough et al. | 708/624 |
| 2012/0011181 A1* | 1/2012 | Samy et al. | 708/204 |
| 2012/0011187 A1* | 1/2012 | Mohamed et al. | 708/523 |

OTHER PUBLICATIONS

"Decimal Multiplication Via Carry-Save Addition", Mark A. Erle, Electrical & Computer Engr. Dept., Lehigh University & Michael J. Schulte, Dept. of Electrical & Computer Engr., University of Wisconsin—Madison, ISBN0-7695-1992-X/03, 2003 IEEE, IEEE International Conference on Application-Specific Systems, Architectures, and Processors, 2003. Proceedings. Jun. 24-26, 2003.

"A High-Frequency Decimal Multiplier", Robert D. Kenney and Michael J. Schulte, Department of ECE, University of Wisconsin, Mark A. Ede, Systems and Technology Group, IBM, 2004 IEEE International Conference on Computer Design, Oct. 11-13, 2004.

"A Parallel IEEE P754 Decimal Floating-Point Multiplier", Brian Hickmann, Andrew Krioukov, and Michael Schulte, University of Wisconsin—Madison Dept. of Electrical and Computer Engineering, Mark Ede, IBM, 25th International Conference on Computer Design, Oct. 7-10, 2007.

(Continued)

*Primary Examiner* — David H Malzahn
(74) *Attorney, Agent, or Firm* — Cantor Colburn LLP; John Campbell

(57) ABSTRACT

A combined binary/decimal fixed-point multiplier that uses BCD-4221 recoding for the decimal digits. This allows the use of binary carry-save hardware to perform decimal addition with a small correction. The described designs provide an improved reduction tree organization to reduce the area and delay of the multiplier and improved reduction tree components that leverage the redundant decimal encodings to help reduce delay. A split reduction tree architecture is also introduced that reduces the delay of the binary product with only a small increase in total area. Area and delay estimates are presented that show that the proposed designs have significant area improvements over separate binary and decimal multipliers while still maintaining similar latencies for both decimal and binary operations.

10 Claims, 12 Drawing Sheets

(56) References Cited

OTHER PUBLICATIONS

"Decimal Floating-Point Adder and Multifunction Unit with Injection-Based Rounding", Liang-Kai Wang and Michael J. Schulte, Department of Electrical and Computer Engineering, University of Wisconsin-Madison, Madison, Proceedings of the 18th IEEE Symposium on Computer Arithmetic, Jun. 25-27, 2007.

"A New Family of High-Performance Parallel Decimal Multipliers", Alvaro Vazques and Elisardo Antelo, University of Santiago de Compostela, Dept. of Electronic and Computer Science and Paolo Montuschi, Politecnico di Torino, Dept. of Computer Engineering, Proceedings of the 18th IEEE Symposium on Computer Arithmetic, Jun. 25-27, 2007.

* cited by examiner $$c_{out} = dx_2x_1x_0 + dx_3x_2\overline{x_0} + \overline{d}x_3 + x_3x_0 + x_3x_1$$

$$2x_3 = d\overline{x_3x_2x_1x_0} + dx_3\overline{x_2x_1}x_0 + \overline{x_3}x_2\overline{x_1} + x_3x_2\overline{x_0} + x_3x_2x_0 + \overline{d}x_2$$

$$2x_2 = dx_3\overline{x_2x_1x_0} + d\overline{x_3}x_1\overline{x_0} + dx_3x_2\overline{x_0} + \overline{d}x_1 + x_3x_1$$

$$2x_1 = d\overline{x_3x_2}x_1x_0 + dx_3\overline{x_2x_1\,x_0} + d\overline{x_3}x_1\overline{x_0} + \overline{x_3x_1}x_0 + x_3x_1x_0 + \overline{d}x_0$$

COMBINED BINARY/DECIMAL FIXED-POINT MULTIPLIER AND METHOD

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer systems and to multipliers useful in floating point arithmetic, and particularly to a decimal/binary multiplier.

2. Description of Background

Before our invention decimal multiplication has been used in computer systems for many commercial applications including banking, tax calculation, currency conversion, and other financial areas. Binary calculations have been used in floating point calculations.

SUMMARY OF THE INVENTION

The shortcomings of the prior art are overcome and additional advantages are provided through the provision of a combined binary/decimal fixed-point multiplier that uses BCD-4221 recoding for the decimal digits which can be used in a large computer system such as those of the IBM System z. System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which allows the use of binary carry-save hardware to perform decimal addition with a small correction.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 6A-1 and FIG. 6A-2 illustrate a 64-bit/16-digit split partial product reduction tree using 4-bit binary 4:2 CSAs in the binary portion of the tree and FIG. 6B-1 and FIG. 6B-illustrate a 53-bit/16-digit split partial product reduction tree (FIG. 6b) both using 4-bit binary 4:2 CSAs in the binary portion of the tree.

FIG. 7 shows the Boolean equations for our doubling unit.

The detailed description explains the preferred embodiments of the invention, together with advantages and features, by way of example with reference to the drawings.

DETAILED DESCRIPTION OF THE INVENTION

Figure 1:
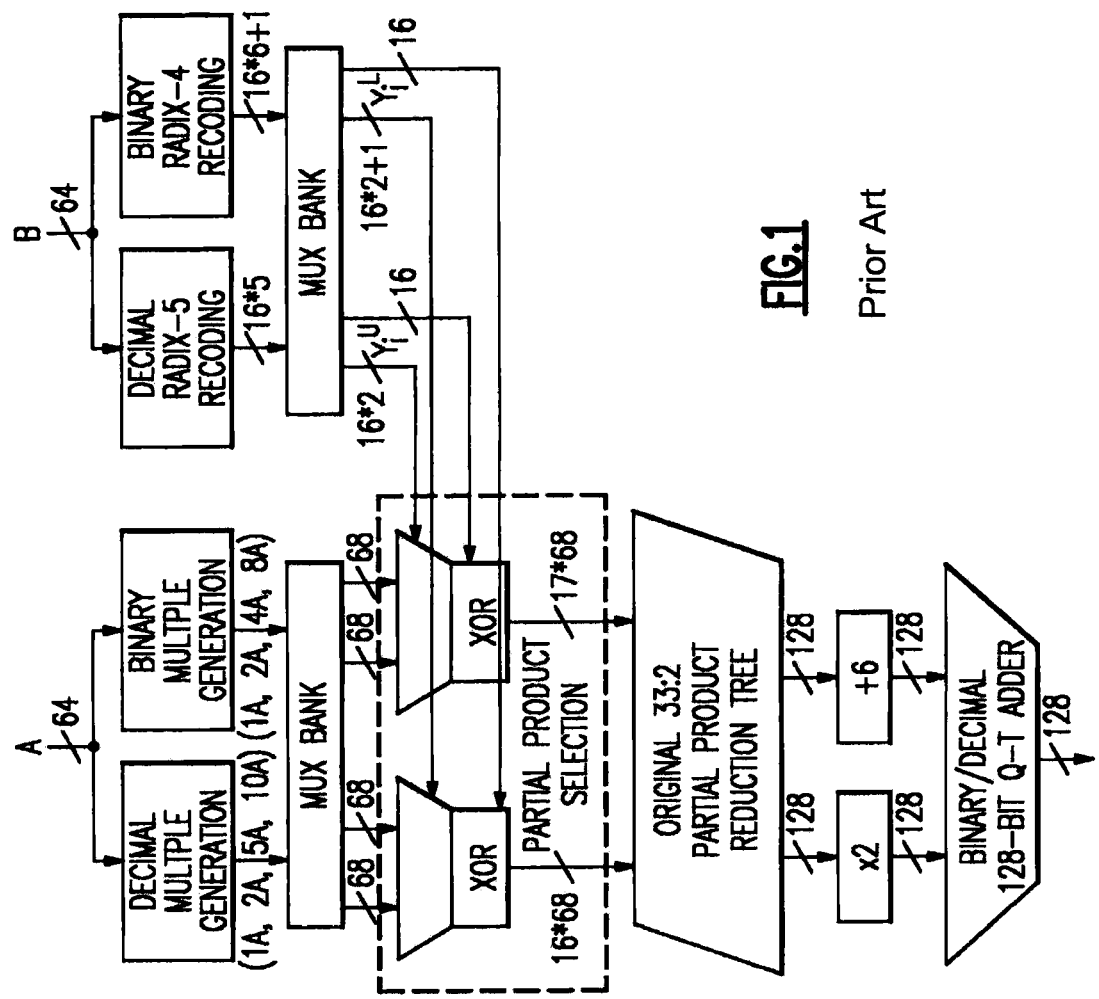
FIG. 1 illustrates a Binary Radix-4/Decimal Radix-5 Combined Multiplier.
Figure 2A:
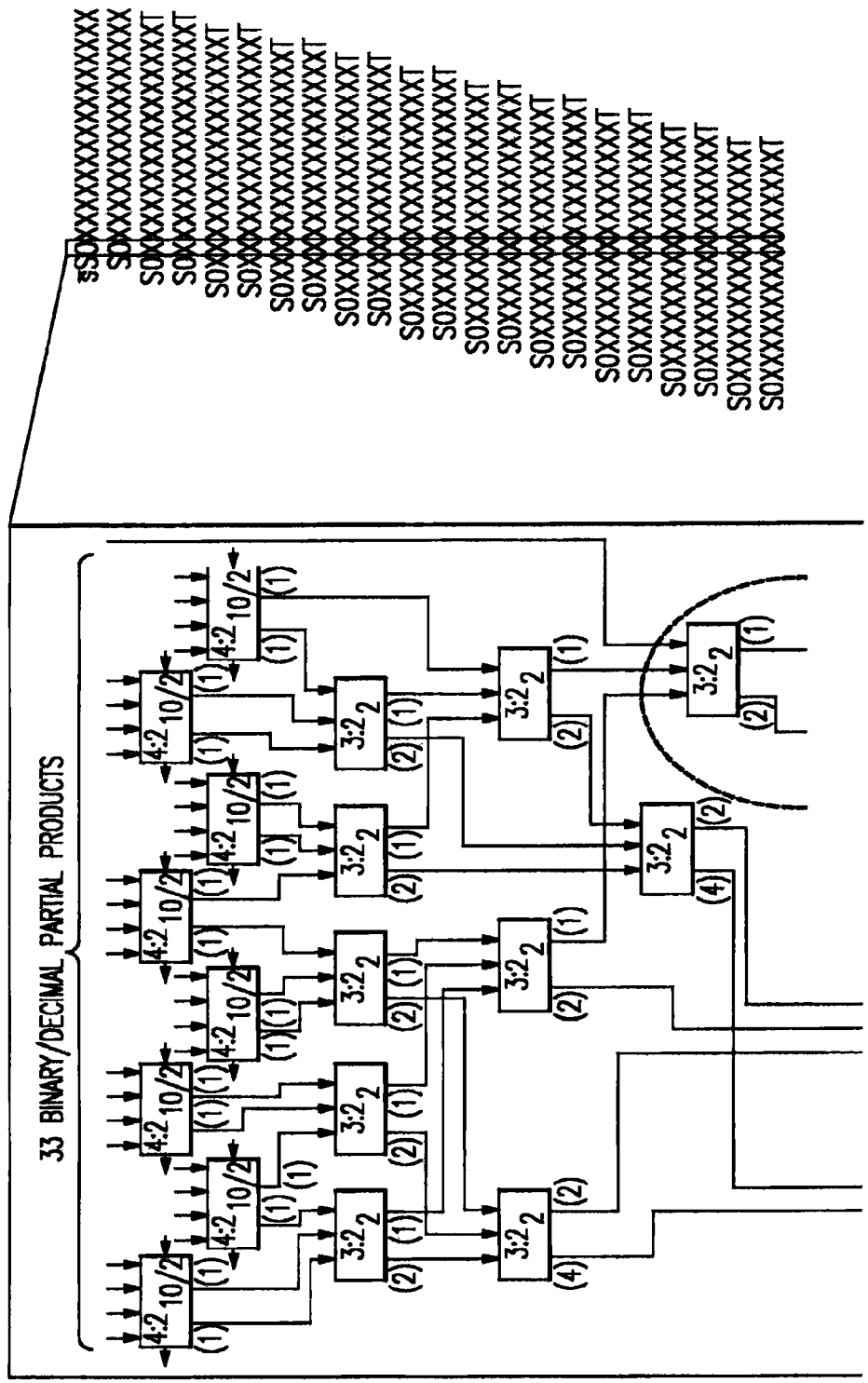
FIGS. 2A and 2B illustrate a. Partial Product Reduction Tree and Alignment.
Figure 2B:
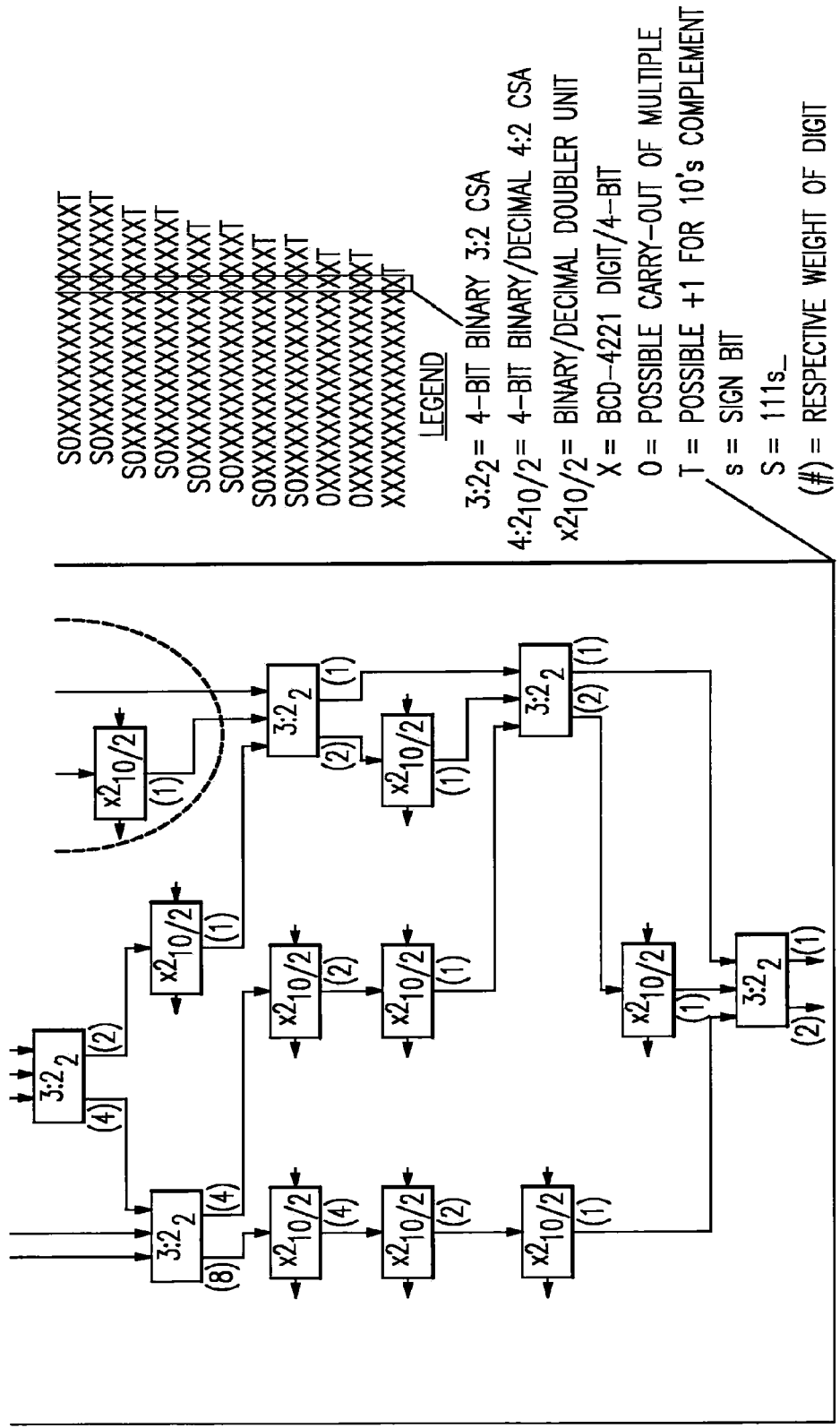

Turning now to the drawings in greater detail, it will be seen that in FIG. 1 there is a combined binary/decimal fixed-point multiplier that uses BCD-4221 recoding for the decimal digits. This allows the use of binary carry-save hardware to perform decimal addition with a small correction. Our designs described herein contain several improvements over previously published designs. These include an improved reduction tree organization to reduce the area and delay of the multiplier and improved reduction tree components that leverage the redundant decimal encodings to help reduce delay. A novel split reduction tree architecture is also introduced that reduces the delay of the binary product with only a small increase in total area. Area and delay estimates are presented that show that the proposed designs have significant area improvements over separate binary and decimal multipliers while still maintaining similar latencies for both decimal and binary operations.

The present invention provides a combined binary/decimal fixed-point multiplier, and we also show multiplier features for a reduction that does not use binary/decimal 4:2 compressors during reduction. This improves the delay and especially the area of the multiplier. Another enhancement we have provided as discussed below is the use of binary/decimal doubling units that use the flexibility of the redundant decimal digit encodings to reduce their delay.

We provide two novel reduction tree designs with split binary and decimal outputs that significantly reduce the latency of the binary multiplication with a minor area penalty. The combined binary and decimal multiplier designs are for 16-digit decimal multiplication and either 64-bit or 53-bit binary multiplication, since these sizes are useful in the design of IEEE P754 compliant double-precision floating-point multipliers. However, the techniques can be extended to other multiplication sizes. Compared to using separate binary and decimal multipliers, one of our designs offers a 43\% area savings while maintaining the same latency as the original separate multipliers. In addition, as compared to the combined design proposed by Vazquez et al 2007 (A New Family of High.Performance Parallel Decimal Multipliers, by Alvaro Vazquez, Elisardo Antelo, and Paolo Montuschi, ARITH '07 Proceedings of the 18th IEEE Symposium on Computer Arithmetic, Pages 195-204), our split tree multiplier obtains improved binary multiplication latency while also obtaining up to a 25\% area reduction over the original separate multipliers.

Decimal Multiplier

Table 1 illustrates the BCD-8421 and BCD-4221 Codings.

Note that herein we represent alternate decimal encodings in the format BCD-xxxx where the x's are the weights of each binary bit. For example, 10012 has a value of $4+0+0\_1=5$ with the BCD 4221 encoding and a value of $8+0+0+1=9$ with the BCD 8421 encoding.

Unsigned decimal multiplication performs the computation $P=A*B$, where A is the multiplicand, B is the multiplier, and P is the product. It is assumed that A and B are each pdec Binary Coded Decimal (BCD) digits and P is 2 times pdec BCD digits. As with binary multiplication, decimal multiplication consists of three primary stages: generation of partial products, fast addition or reduction of these partial products, and a final carry propagate addition (CPA). Decimal multiplication is much more complex, however, due to the higher range of decimal digits (0-9), which increases the number of multiplicand multiples that must be generated to form the partial products, and the inefficiency of adding or reducing BCD operands.

To address the first complexity of generating multiplicand multiples for partial products, many recent designs use either a reduced set of stored multiplicand multiples or a signed-digit recoding to decrease the required number of multiplicand multiples that must be generated. Proposed methods presented in Vazquez et al 2007 for using a reduced set of multiples can significantly decrease the delay for generating the partial products and the area needed to store the multiples. This can be further enhanced by using multiples from the set (1A, 2A, 4A, 5A, 8A, 10A), which can be generated without the need for carry propagation. However, the use of a reduced set of multiples often doubles the number of required partial products to 2*pdec. An alternate method, as proposed in Vazquez et al 2007, uses a signed digit recoding such as [−5, 5]. This recoding requires that only the (1A . . . 5A) multiples and their inverses be generated, but it includes a 3A multiple that needs a carry propagate addition. The advantage of this method is that only pdec+1 partial products are needed.

To improve the speed of decimal addition with BCD operands, a straight forward method is to use normal binary CSA or CPA hardware to perform decimal addition by first adding a correction of six to each digit of one input operand and then selectively subtracting six from the digits of the result to generate the correct the sum has been used; however, the required addition and subtraction of 6 is on the critical path. An alternative method is direct decimal addition using decimal carry-save adders (CSAs). This method offers improved speed by directly computing the decimal sum without the use of binary hardware. Decimal CSAs also allow multiple decimal values to be summed without carry-propagate addition to produce a decimal carry-save output.

However, here we use binary CSAs to sum decimal numbers using alternate BCD encodings. In Vazquez et al 2007, a reduction method is proposed for decimal multiplication that uses binary CSAs and the BCD-4221 encoding, where using e.g. 10012 has a value of 4+0+0+1=5 with the BCD-4221 encoding as noted above for Table 1. The use of the BCD-4221 encoding has three primary advantages. First, since all 16 possible BCD-4221 encoding values are valid decimal digits, regular 4-bit binary CSAs can be used to perform the decimal addition as long as decimal doubling units (x2 units in Vazquez et al 2007) are used to correct the carry digit. Second, BCD-4221 allows for efficient decimal doubling, requiring only a two-level logic function to perform this operation. Third, BCD-4221 is self-complementing, which allows the 9's complement to be computed with a simple bitwise inversion. This is can be advantageous when using signed digit recodings, which require the inverses of the multiplicand multiples.

Figures 1, 6A:
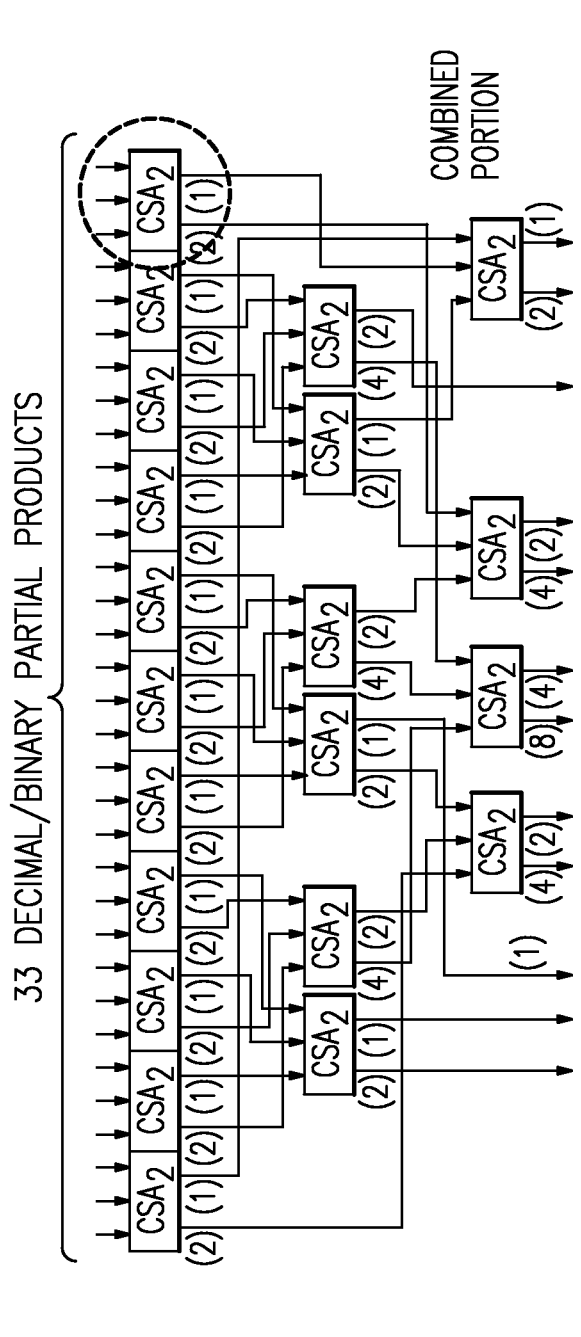
Figures 2, 6A:
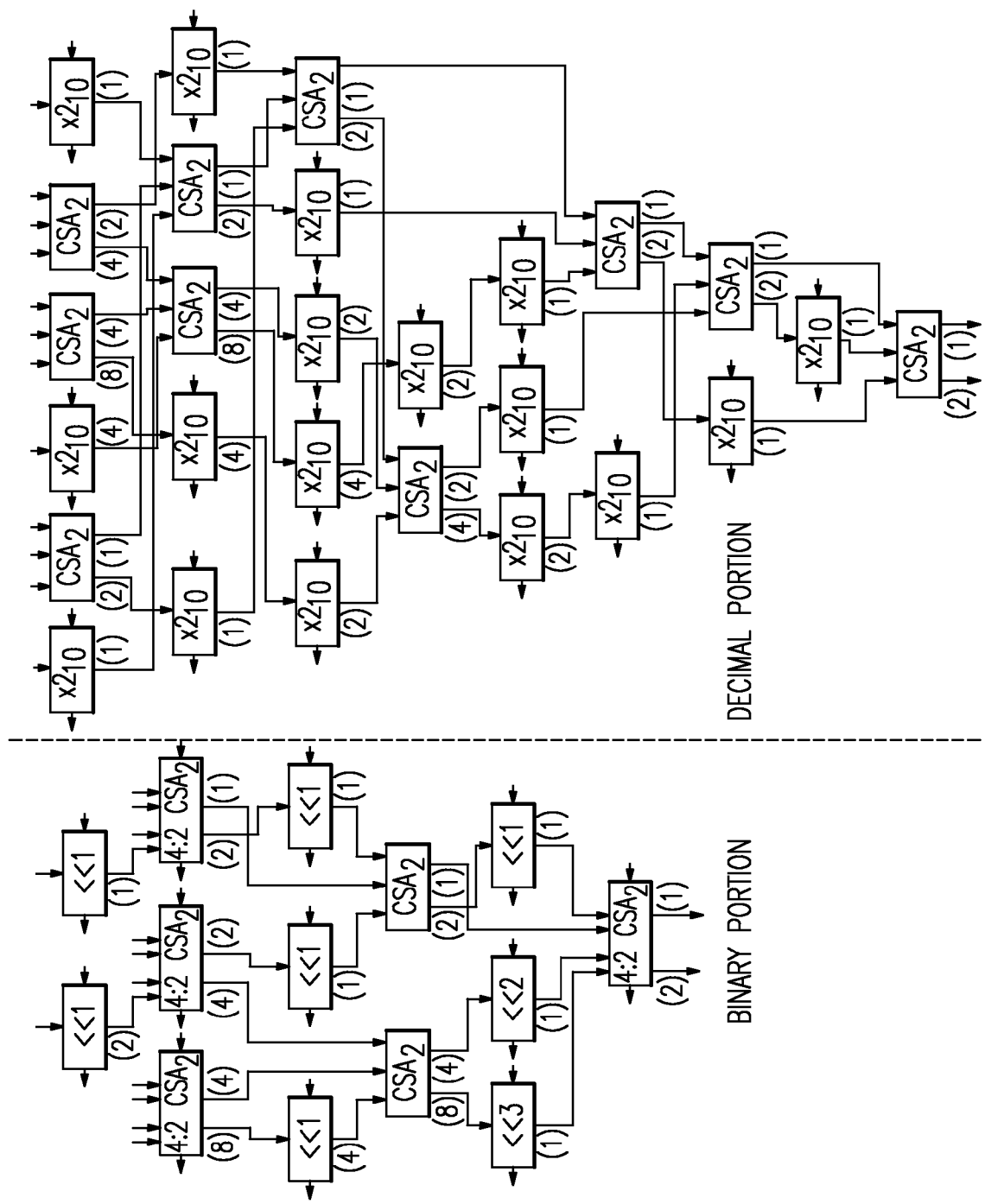
Figures 1, 6B:
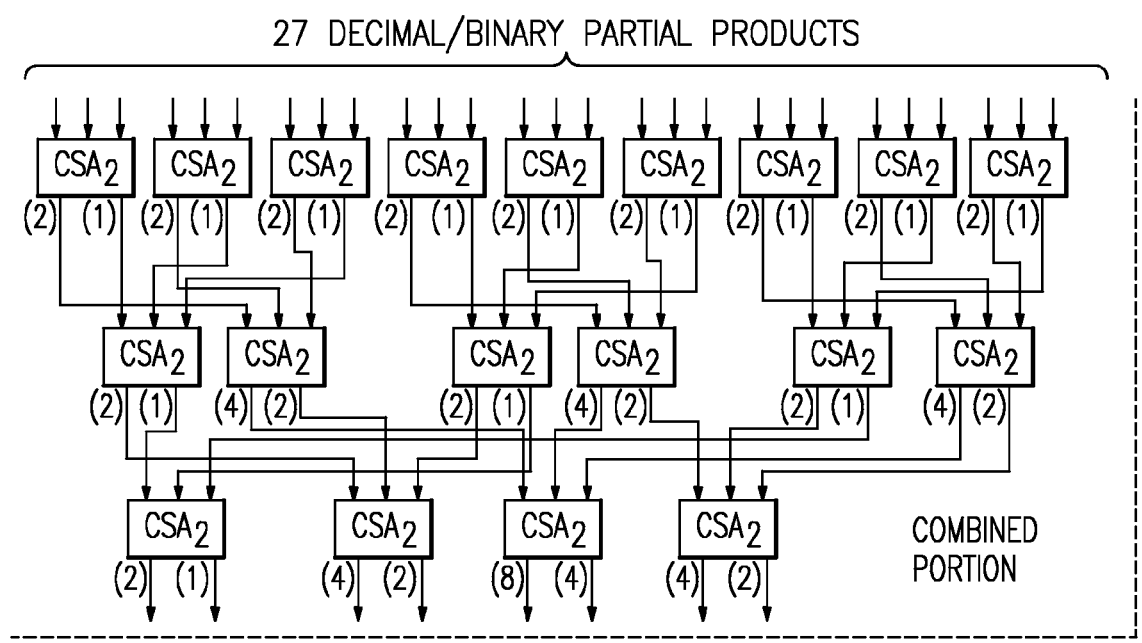
Figures 2, 6B:
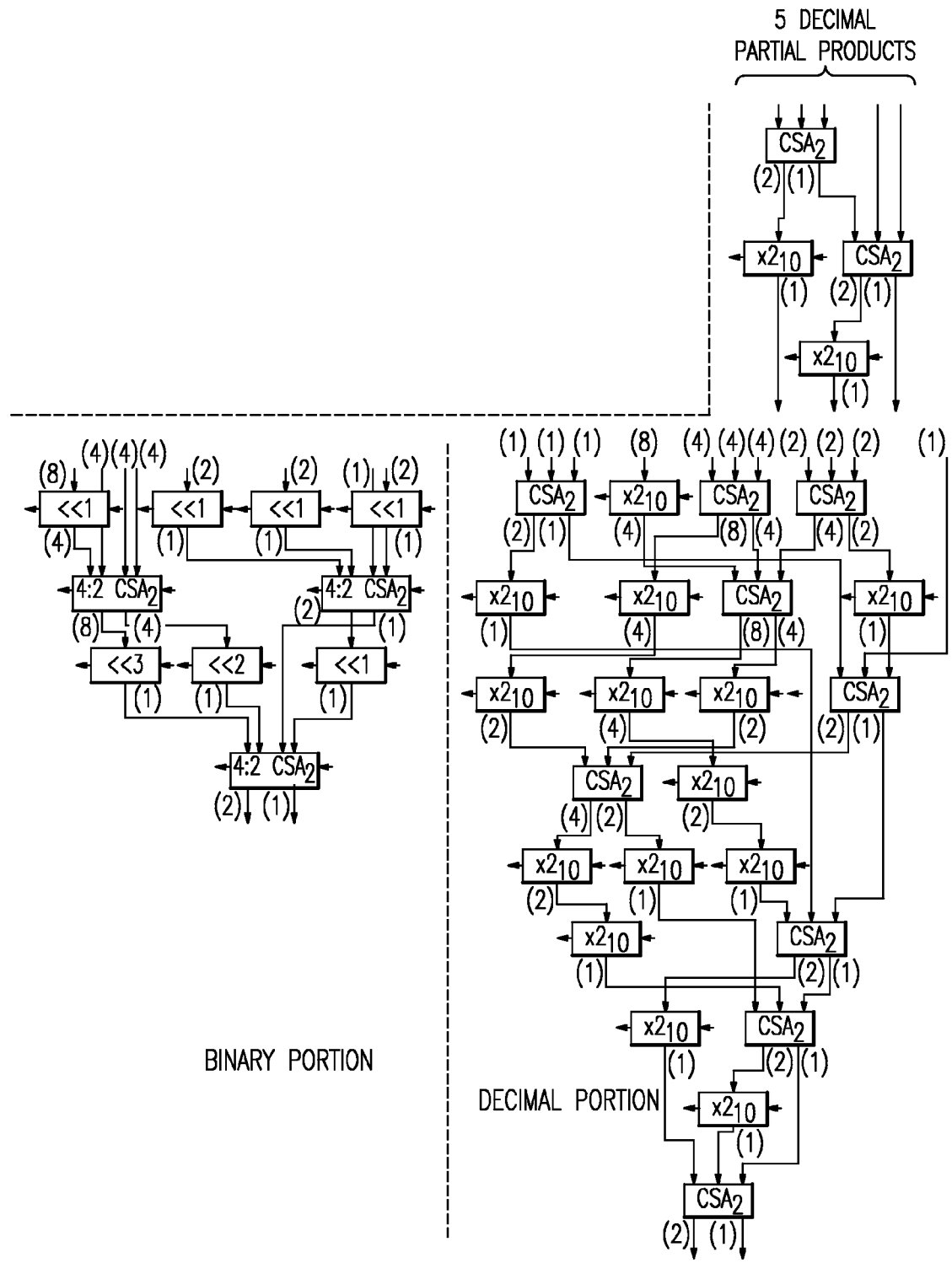

FIG. 2. Vazquez et al 2007 Partial Product Reduction Tree and Alignment

The combined binary/decimal multiplier presented in Vazquez et al 2007 is shown in FIGS. 1 and 2. The multipliers presented in Vazquez et al 2007 use special BCD digit recodings to reduce the logic needed to perform decimal multiplication. While two combined multiplier architectures are presented in Vazquez et al 2007, we discuss here extending the binary radix-4/decimal radix-5 multiplier. In this multiplier, the binary operands are recoded into signed radix-4 values using the standard modified Booth recoding described by Stamatis Vassiliatis et al, IEEE Transactions on Computers, Vol. 40, no 11, pp. 1181-1197 in November 1991 (Vassiliatis 1991) and the decimal operands are recoded into signed radix-5 values. We chose to extend this binary radix-4/decimal radix-5 combined multiplier design over the binary radix-4/decimal radix-4 design proposed in Vazquez et al 2007 because of its lower latency decimal multiple generation process. Also, in the decimal radix-4 recoding, an additional decimal partial product is required, which may increase the area and delay of the decimal multiplication.

The combined binary radix-4/decimal radix-5 multiplier from Vazquez et al 2007 is shown in FIG. 1 for pdec=16 digits. It consists of five main components: generation of multiplicand multiples, recoding of the multiplier operand, partial product selection, partial product reduction, and a final carry propagate addition (CPA) to produce the non-redundant result. The partial product selection and reduction stages, along with the final CPA, are shared between binary and decimal operations while the multiplicand multiple generation and multiplier recoding are separate for each operation with multiplexers selecting the correct result based on the current operation type. The generation of multiplicand multiples, partial product selection, and final CPA stages are not changed in our computer system having a combined multiplier described below with crespect to FIG. 4.

In our computer system, to begin a multiplication, multiplicand multiple generation and multiplier recoding operate in parallel. Separate binary and decimal multiplicand multiples are generated. The binary portion generates the (1A, 2A, 4A, 8A) multiples using simple wired shifts. The decimal portion generates the (1A, 2A, 5A, 10A) multiples using wired shifts and digit recodings. All decimal multiples are encoded in BCD-4221 to allow the reduction tree to use binary CSAs even when performing decimal addition. A multiplexer following the multiple generation selects between the binary and decimal multiples. The complements of both the binary and decimal multiples are also required and, since BCD-4221 is a self-complimenting code, this is done during partial product selection through simple bitwise inversion. The multiplier digits are recoded for both the binary and decimal case in groups of 4-bits or 1-digit respectively. For binary, the normal modified Booth recoding is performed on overlapping groups of three bits to produce signed digits with values of $\{-2, -1, 0, 1, 2\}$. In order to share the partial product selection multiplexers with decimal recoding that examines 4-bits (i.e. 1 digit) at a time, the binary recoding logically performs two modified Booth recodings on overlapping groups of five bits. This produces two signed digits with values of $\{-2, -1, 0, 1, 2\}$ and $\{-8, -4, 0, 4, 8\}$ respectively. The decimal recoding proceeds similarly but examines a single input digit during recoding to produce two output signed digits with values of $\{-2, -1, 0, 1, 2\}$ and $\{0, 5, 10\}$. The two signed digits from both recodings are encoded into a one-hot form with a single sign bit and two selection bits, represented by $YL_i$ and $YU_i$ where L and U represent the Lower and Upper recoded digits, respectively, for the ith digit or 4-bit group. A multiplexer selects between the binary and decimal recodings to produce a single set of by $YL_i$ and $YU_i$ values that are used to perform partial product selection. As presented in Vazquez et al 2007, it is important to note that the above recoding process will produce 2*pdec partial products for both the binary and decimal case. However, when multiplying 64-bit unsigned binary numbers, this will give an incorrect result if the last recoded sign digit is negative. This case requires that an additional partial product of 1× be added to the reduction tree, resulting in 2*pdec partial products. This correction is discussed more below with respect to our improved embodiment.

Next, partial product selection is performed using the YLi and YUi values from the multiplier recoding and either the binary or decimal multiples from the multiplicand multiple generation unit. A set of two one-hot multiplexers per input digit or 4-bit group creates two partial products that are reduced in the partial product reduction tree. Following each multiplexer is an XOR gate that uses the sign bits from the recoding to perform conditional inversions of the multiples when needed.

Figure 3A:
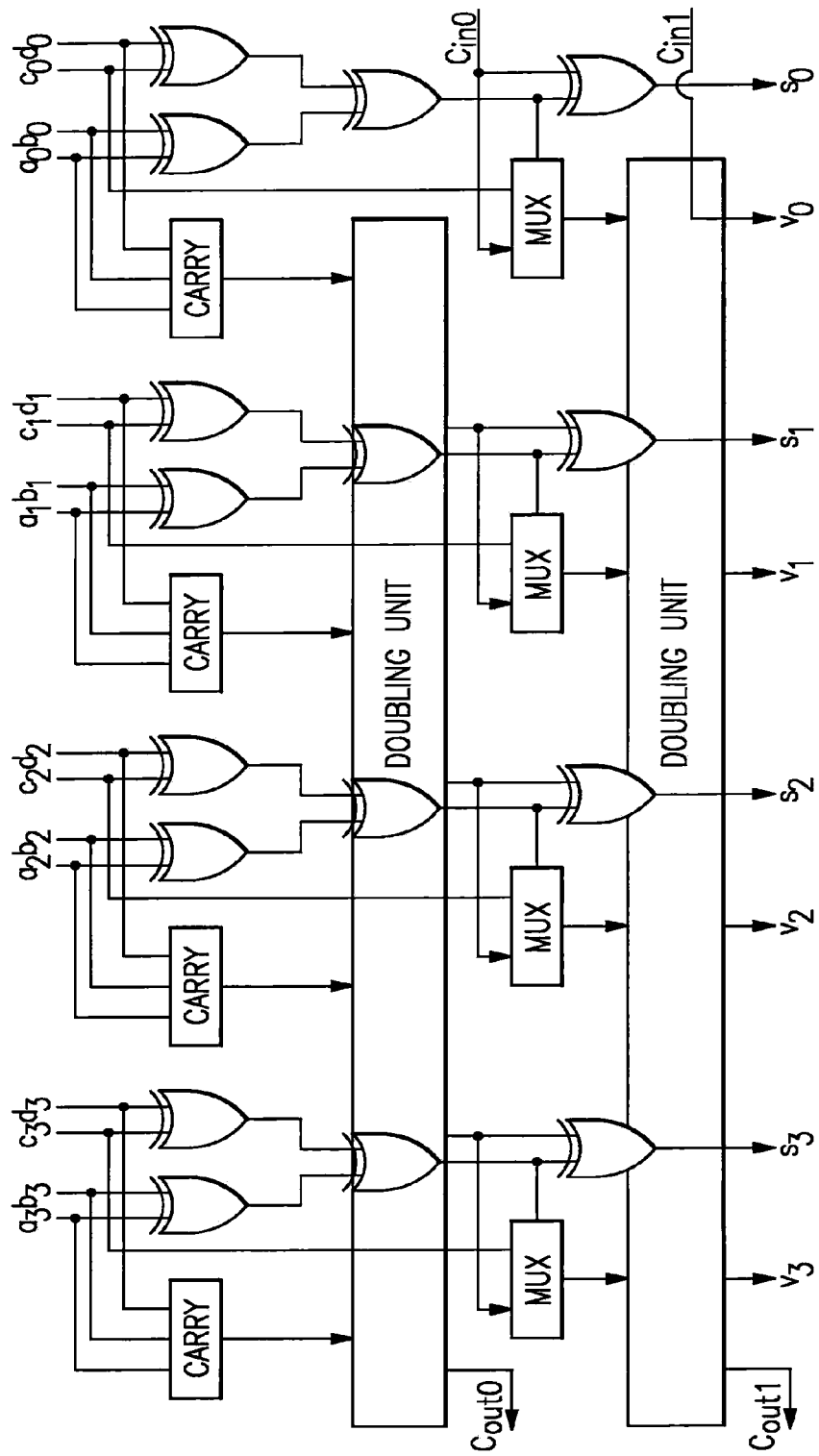
FIG. 3A illustrates a Reduction Tree Components including the Binary Decimal 4:2 CSA
Figure 3B:
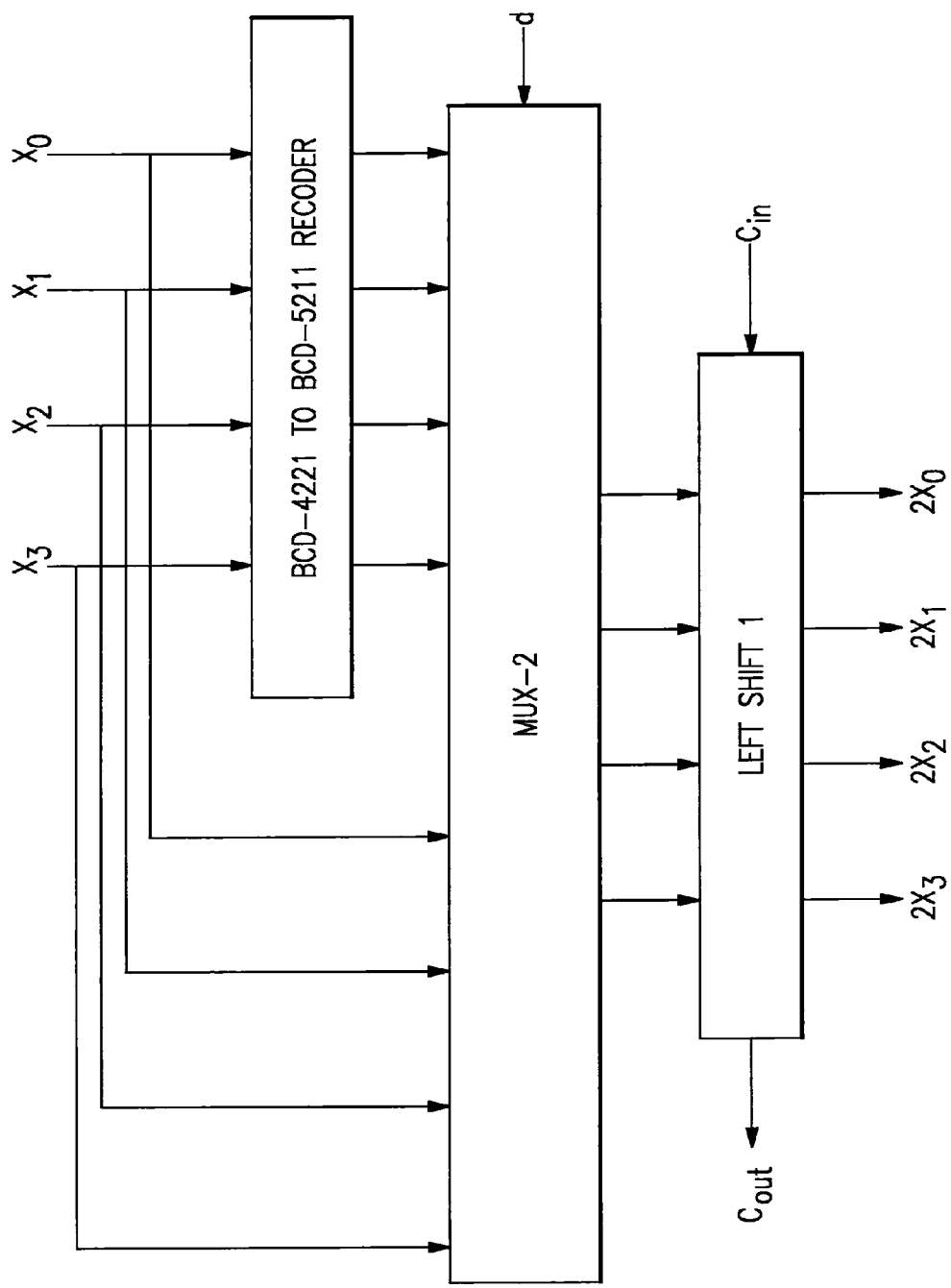
FIG. 3B illustrates a Binary Decimal Doubling Unit.

FIG. 3 shows the Reduction Tree Components of Valquez et all 2007 including the Binary Decimal 4:2 CSA (FIG. 3a) and the Binary Decimal Doubling Unit (FIG. 3b) which are used in our combined Binary/Decimal Fixed-Point Multiplier.

After selection is performed, the partial products are aligned and then sent to the partial product reduction tree. Due to the alignment process, the number of partial products that must be accumulated in any one column ranges from 3 to 2 times pdec+1 as shown on the right-side of FIG. 2 for pdec=16. During the alignment process, additional bits or digits are added in order to correctly handle the sign extension of the partial products as also shown in FIG. 2. It is important to note that the 2*pdec+1 partial product arises only in the binary case and is always 0 when performing decimal multiplication.

A single worst-case column of the reduction tree with 33 input digits is shown on the left side of FIG. 2. In this FIG. 2, we use the subscript "10/2" to indicate the circuit contains additional logic to correctly generate both binary and decimal outputs while a subscript of "2" or "10" indicates that the circuit has purely binary or decimal logic, respectively. This reduction tree has been slightly modified from the original tree in Valquez et al 2007 to account for the additional binary partial product. For the reduction tree in FIG. 1 where pdec=16, this requires a worst-case tree that can accumulate 33 partial products.

The small correction added to handle the extra partial product is highlighted with a dotted circle in FIG. 2. The reduction tree is made up of 4-bit binary 3:2 compressors, 4-bit binary/decimal doubling units that contain logic to perform decimal digit doubling in the decimal case and a simple left shift in the binary case, and combined binary/decimal 4:2 compressors. Our doubling and 4:2 compressor units are the same as those from Valquez et al 2007 and are pictured in FIG. 3. In FIG. 3 the d signal indicates whether the current operation is decimal (d=1) or binary (d=0).

Finally, after the partial products have been reduced, the result must be converted into non-redundant form. This is done with a 128-bit/32-digit combined binary/decimal conditional speculative quaternary tree adder, as done by A. Vazquez and E. Antelo:Conditional Speculative Decimal Addition" published in 7th Conference on Real Numbers and Computers, July 2006, pp. 47-57. This adder is based on a sparse quaternary tree that generates only every fourth carry. In parallel with the carry tree, a carry-select adder generates the intermediate 4-bit sums for both a carry-in of one and a carry-in of zero. A final multiplexer uses the results of the carry tree to select the results. To perform decimal addition, six is speculatively added to the digits of one of the operands, and corrective logic in the carry select adders coerces the output to the correct value in case of a mis-speculation.

Combined Binary/Decimal Fixed-Point Multiplier

Figure 4:
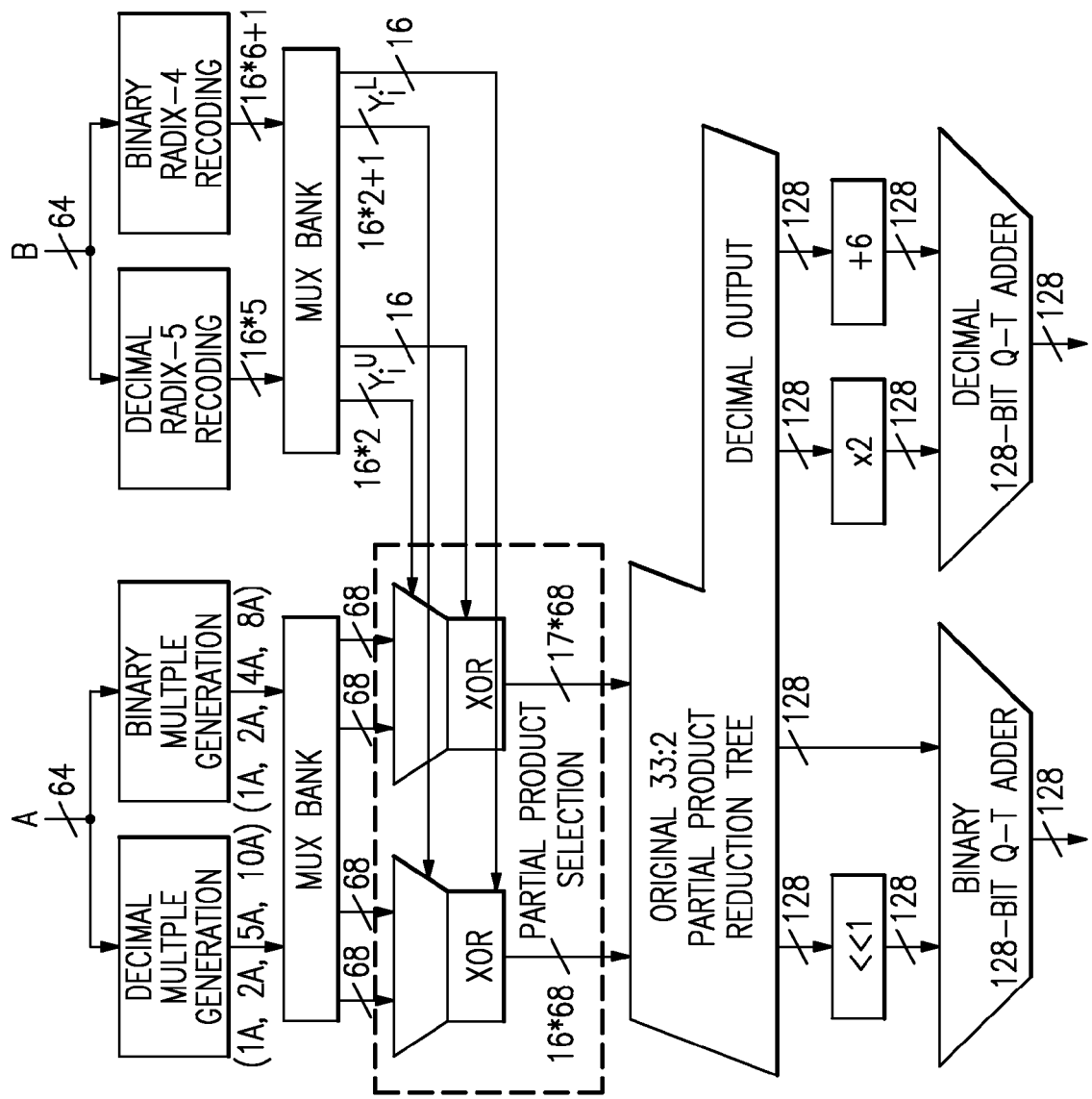
FIG. 4 illustrates an embodiment of a computer system which has a combined binary/decimal fixed-point multiplier.

With respect to our embodiment, the computer system of FIG. 4, details of which we will describe more fully, has a combined binary/decimal fixed-point multiplier having major changes from Valquez et al 2007.

As shown in FIG. 4, the combined binary/decimal fixed point multiplier has a 64-bit A input that feeds into respective decimal and binary multiple generators feeding a partial product selector via a nultiplexer bank, and a 64-bit B input that feeds into decimal Radix-5 BCD-4221 Booth recoding and binary Radix-4 recoding elements also supplying their multiplexed output to the partial product selector. The output of the partial product selector having an improved binary/decimal doubling unit is now supplied to a split 33:2 partial product reduction tree having 3:2 CSA (Carry Save Adder) logic with binary/decimal doubling units having a separate binary output and a decimal output, respectively supplying a 128 bit combined binary/decimal conditional quaternary tree adder performing the final carry-propagate addition for the binary output and decimal output. The multiplier has a corrective 3:2 CSA to correct an extra partial product of the reduction tree caused when the multiplier has a one in the most significant bit.

As discussed in the following subsections, major improvements include:

1.—An improved tree that does not use 4:2 decimal compressors and instead employs 3:2 CSAs for decimal compression which reduces the number of x2 doubling units to help delay/area;

2.—An improved doubling x2 unit that utilizes the flexible and redundant BCD-4221 encoding to reduce logic area and delay, depending on the technology standard cells types and their speeds;

3.—A fixed binary 64-bit operation which correctly performs 64-bit unsigned binary multiplication;

5.—Finally, a split tree design that significantly reduces the latency of binary output by sharing only the top half of the reduction tree, in which lower half is split before any x2 units are used to prevent penalizing the binary path which uses separate adders and additional area.

Figure 5:
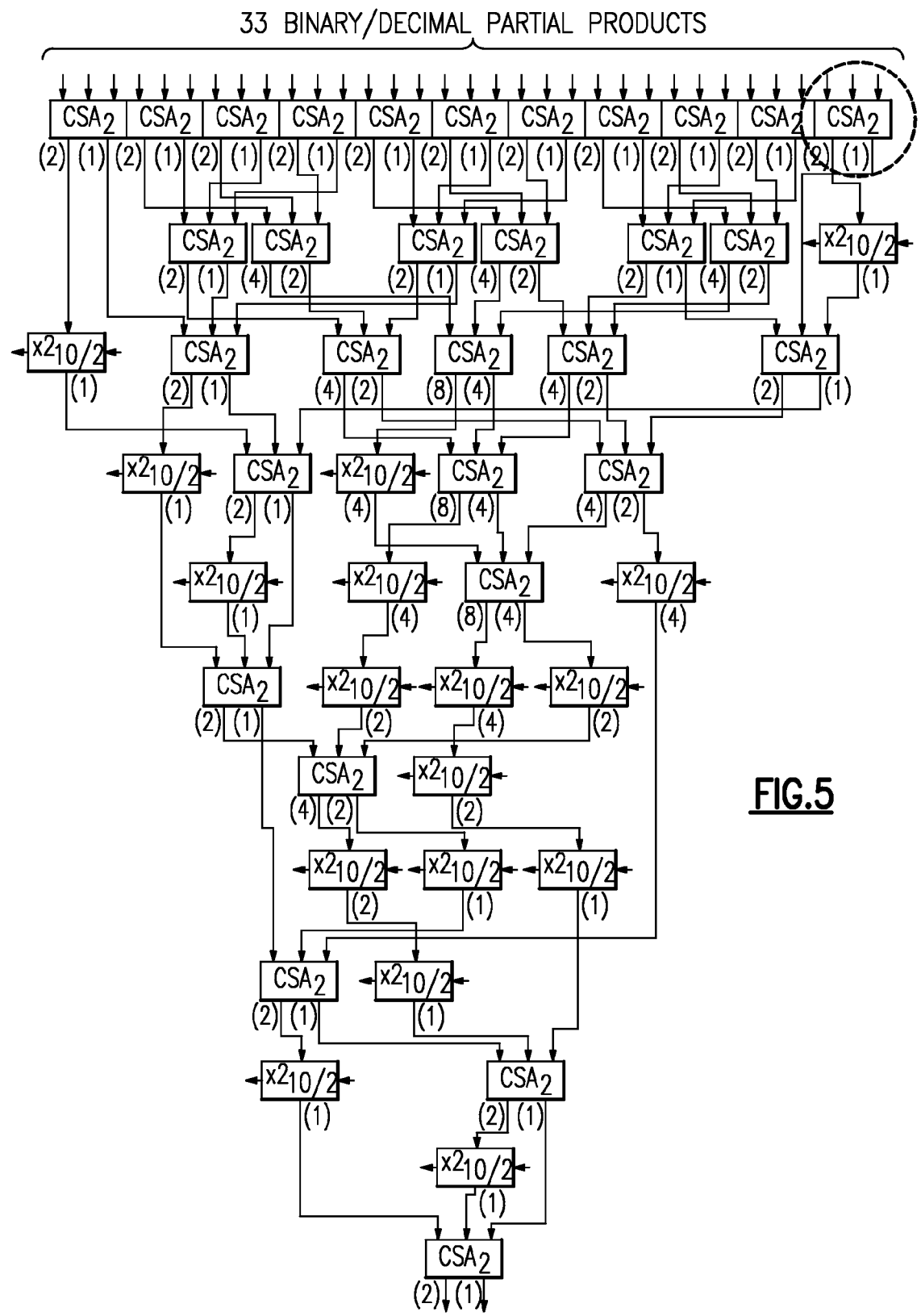
FIG. 5 provides our partial product reduction tree for BCD-4221 encoding.

As will be seen in the embodiment illustrated by FIGS. 4, 5, and 6, we provide differing embodiments with changes over the multiplier design of Valquez et al 2007 illustrated in FIG. 1. Our embodiment improves the delay and the area of the multiplier. The latency of the binary multiplication is reduced so that it is not penalized as compared to a standalone binary multiplier. The improvements include an improved reduction tree that does not use 4:2 compressors during reduction. The 4:2 compressors presented in Valquez et al 2007 use two binary/decimal doubling units which include multiplexers that can significantly add to the delay and area of the multiplier. We provide an improved reduction tree that has no need for binary/decimal 4:2 compressors and thus does not us them to improve the design. We also extend the tree to handle reducing the necessary 2 times pdec+1 partial products to correctly handle unsigned binary operands. Another improvement over the previous design is the use of improved binary/decimal doubling units that use the flexibility of the redundant BCD-4221 encoding to improve the speed of the doubling units. Finally, we present a new reduction tree design with split binary and decimal outputs. This design avoids having the additional multiplexers needed in the original design to share the doubling units. The result is that the latency of the binary multiplication is significantly reduced with only a reasonable area penalty. Each of these improvements are discussed in more detail in the following subsections.

In our improved embodiment as shown in FIG. 4 the original method for the generation of multiplicand multiples, multiplier recoding, and partial product selection from FIG. 1 are unchanged due to their efficiency. A 128-bit version of the combined binary/decimal conditional speculative quaternary tree adder from an earlier A. Vazquez and E. Antelo:Conditional Speculative Decimal Addition" published in 7th Conference on Real Numbers and Computers, July 2006, pp. 47-57 is employed to perform the final carry-propagate addition. While we investigated other adder designs, this is the faster combined binary/decimal adder, and hence we use it unchanged.

FIG. 5 provides our improved partial product reduction tree using the BCD-4221 encoding.

FIG. 6 provides a 64-bit/16-digit split partial product reduction tree (FIG. 6a) and a 53-bit/16-digit split partial product reduction tree (FIG. 6b) both using 4-bit binary 4:2 CSAs in the binary portion of the tree.

Two of the high-level figures for our improved reduction tree designs are presented in FIGS. 5 and 6. The first design, presented in FIG. 5 shows a 64-bit high level design that uses improved binary/decimal doubling units and improved reduction tree in an organization that is different from the combined binary/decimal multipliers presented in Vazquez et al 2007 illustrated by FIG. 1.

The split Binary/Decimal Multiplier of our embodiment, pictured in FIG. 6, replaces the reduction tree with a split reduction tree design. This design significantly improves the latency of the binary multiplication. The split tree results in two separate outputs: a binary output and a decimal output. In this design we use two separate adders, one for the binary path and one for the decimal path, to generate separate non-redundant results. The two adders are the binary only and decimal only versions, respectively, of the conditional speculative quaternary tree adder from A. Vazquez and E. Antelo: Conditional Speculative Decimal Addition" published in 7th Conference on Real Numbers and Computers, July 2006, pp. 47-57. While using two adders increases the area of the design, it also reduces the delay of both the binary and decimal outputs since the adders are optimized for each operation. This design also allows a new binary or decimal multiplication to be started each cycle in a pipelined design without the need to wait for the pipeline to empty, as is true with the original design in FIG. 1 and the improved design shown in FIG. 4. If lower area is desired and the above property is not critical, then the combined binary/decimal adder from the first design may be used in place of the separate adders.

The bit width of our improved design can also be varied. FIG. 6 also illustrates a modified 53-bit/16-digit multiplier instead of an illustrated 64 bit, when it is desired to employ the 53-bits and 16-digits lengths of the significands of double precision binary and decimal floating point numbers, respectively, from the IEEE P754 standard. The reduced binary width has several advantages that can be exploited in the design of the split reduction tree. This also allows for the use of a smaller 106-bit binary CPA, or number otherwise appropriate to the width chosen to be employed, to further reduce the latency of the binary multiplication. The overall layout of the multiplier is shown then has a split design as shown but the binary CPA is reduced to 106-bits and the tree is reorganized to accommodate.

Improved Reduction Tree

A single column of the improved standard reduction tree for pdec=16 is illustrated in FIG. 5. The primary advantage of this improved tree over the one shown in FIG. 2 is the removal of the leading combined binary/decimal 4:2 CSAs at the top of the tree. As pictured in FIG. 3, each binary/decimal 4:2 compressor contains two binary/decimal doubling units. In a combined binary/decimal multiplier, these doubling units represent a significant overhead inside the reduction tree due to the multiplexers needed to select between the binary wired shift and the decimal digit recoding logic, depending on the current operation. To reduce this overhead, we present an improved reduction tree that uses only binary 3:2 compressors and binary/decimal doubling units. It is organized in a manner similar to that of the reduction tree from Vazquez et al 2007, but reduces the number of doubling units needed. A single worst-case column of the proposed reduction tree only has 16 doubling units as compared to the original's 25 doubling units. Both single columns of the proposed and original reduction trees contain approximately 31 effective 3:2 CSAs, if 4:2 CSAs are counted as having effectively two 3:2 CSAs.

Accordingly, as illustrated by FIGS. 3, 4, 5 and 6, for the basic doubler circuit, a Binary Coded Decimal formatted encoding is used, which has bits weighted by 4, 2, 2 and 1, called BCD-4221, which differs from the common Binary Coded Decimal format that has weights of 8, 4, 2, and 1, is used for selection encoding. BCD-4221 has a unique property that all combinations are valid decimal numbers between 0 and 9. Through selection the doubler circuit doubles a binary integer number. Thus, besides being used for BCD-4221 digits, the doubler circuit is used for combined BCD-4221 and binary multiplication in the multiplier. In a combined BCD-4221 and binary multiplier, which we provide in our preferred embodiment data, the input value to the doubler is received as a 4-bit value, said value representing a BCD-4221 digit or a 4-bit binary integer, and a selection signal indicating the type of data. The carry output of the doubler circuit is a 1-bit carry out and a 4-bit BCD-4221 digit or a 4-bit binary integer equal to the double of the input. The carry out is equal to 10 when the 4-bit output is a BCD-4221 digit and 16 when it is a binary integer.

Thus, the doubler circuit provides an overall logic function to realize the doubling through the integration of the selection signal into the logic generation of each output bit. The logic functions achieved are those of FIG. 7 for the same decimal or binary value.

Now in accordance with a preferred embodiment illustrated by the drawings showing the combined decimal/binary multiplier having a split reduction tree, a reduced logic counter tree is used for the decimal multiplier. A 16 digit decimal multiplier for Binary Encoded Decimal format which has bits weighted 4,2,2,1 called BCD-4221, has a counter tree (or partial product reduction tree) consisting of 4:2 counters, 3:2 counters, and doublers. This circuit is used also to perform 64-bit binary unsigned integer multiplication. The number of 3:2 counters and doublers is varied dependent upon the number of 4-bit decimal or binary values to be reduced down to 2, 4-bit decimal or binary values. For reducing a maximum of 33, 4-bit decimal or binary values in multiplier input has ports for receiving 33, 4-bit value data representing a BCD-4221 digit or a 4-bit binary integer, and a selection signal to indicate the type of data, and as a result of the logic function the combined decimal/binary multiplier data provides output of 2, 4-bit values of the respective input type, with the arrangement of 3:2 counters and doublers in FIG. 3 which illustrated arrangement minimizes the number of doublers. Accordingly, the logic function of 3:2 counters and doublers shown in FIG. 3 is used to reduce smaller amounts of 4-bit decimal or binary values as is necessary for the remaining columns of data in the partial product array.

In addition to the reduction in the number of doubling units, the proposed reduction tree also correctly handles the 2 times $p_{dec}+1$ partial products that may be needed in the binary case. The additional partial product arises from the fact that the modified Booth recoding used to recode the multiplier operand during binary multiplication is designed to work with signed input operands Vassiliadis 1991. When the multiplier has a one in the most significant bit, the modified Booth recoding will select a negative multiple and produce the incorrect result. In order to apply this recoding to an unsigned operand, an implicit zero is pre-pended to the input operand, resulting in 2 times $p_{dec}$+1 partial products from the Booth recoding. The correction added to the largest columns in the reduction tree can be found in the dotted circles in FIG. 2 and FIG. 5. For these figures $p_{dec}$=16 and hence the trees must correctly reduce 33 partial products. In both cases, the addition of the extra partial product simply introduces a single extra 3:2 CSA to the reduction tree and does not significantly impact the delay of the tree.

Improved Doubling Unit

To reduce the delay of the binary/decimal doubling units found within the reduction tree, we propose a new doubling unit that significantly reduces delay as compared to the original doubling unit presented in Vazquez et al 2007. The original design, pictured in FIG. 3, has a high delay due to the addition of a multiplexer to select between the binary and decimal result. The critical path involves four levels of logic from the decimal inputs to the output. To reduce this delay, we propose folding the multiplexer into the logic needed to perform the decimal doubling operation to create two-level functions that are then optimized by our synthesis tools. Since both the binary and decimal doubling operation involve a wired shift, there is an opportunity to share terms in the output.

To increase the effectiveness of this method, we also take advantage of the redundancy of the BCD-4221 encoding. As illustrated in Table 1, there are multiple ways to represent each of the decimal digits. By selecting efficient BCD-4221 encodings, we reduce the logic for the doubling unit. Based on our work with the various BCD-4221 encodings, we have determined to select the equations of FIG. 7 for the Boolean logic of the doubling unit.

By synthesizing these equations against the original design from FIG. 1 Vazquez et al 2007 we obtain a 63% reduction in critical path delay with a corresponding 53% area increase when both designs are optimized for speed. When optimizing for area, the new design has a 2.1% area advantage and a 1.4% delay advantage over the original design. This second comparison is important because during synthesis of the entire multiplier, less critical trees using the new design can still be optimized to offer significant area savings. It is important to note that these equations and results are somewhat dependent on the technology being used, its area and delay characteristics, and the cells available. However, the general insight of combining the multiplexer with the decimal doubling logic and taking advantage of the redundancy of the BCD-4221 encoding can be applied in any technology we would use in making our multiplier.

Split Reduction Tree

FIG. 6 illustrates our split reduction tree which provides a 64-bit/16 digit split partial product reduction tree. While the combined binary/decimal designs presented in Vazquez et al 2007 allow for significant hardware sharing between the binary and decimal multiplication, they also significantly increase the latency of the binary multiplication as compared to a standalone binary multiplier. This is primarily due to the fact that several additional multiplexers inside the binary/decimal doubling units must be traversed in the reduction tree in order to allow it to be shared with the decimal multiplication. In the binary case, the logic in the doubling units are pure overhead since only wired shifts are needed if the binary multiplication is performed in a stand-alone unit.

To improve the latency of the binary multiplication, we would split reduction tree architecture in which only the upper portion of the reduction tree is shared between the binary and decimal operations. A worst-case column from a 64-bit/16-digit version of this split reduction tree is pictured in FIG. 6. The upper shared portion contains no shared doubling units in order to avoid penalizing the binary path. Once it becomes infeasible to avoid using doubling units to continue the reduction, the tree is split into separate binary and decimal portions. Inside these portions, shared doubling units do not need to be used and hence the binary portion uses wired shifts to achieve the doubling operation. The decimal portion can also use simpler decimal doubling units that no longer contain a multiplexer. This split reduction tree design significantly reduces the delay in producing a binary result. While there is an obvious area penalty due to the replication of parts of the reduction tree, this area penalty is reduced considerably by the use of simpler doubling units without multiplexers. To further reduce the area overhead of this design, 4-bit binary 4:2 CSAs are used in the binary portion of the tree. While these 4:2 CSAs do not offer any significant delay advantages in our technology, the ability to share logic within the 4:2 CSAs allows reduced area in the binary portion.

We also investigated applying the split reduction tree multiplier in a 53-bit/16-digit combined binary/decimal multiplier. This design point is significant because 53-bits and 16-digits are the lengths of the significands of double precision binary and decimal floating point numbers, respectively, from the IEEE P754 standard. In the worst-case we will need to reduce only 32 partial products at this design point because the extra partial product from the unsigned binary multiplication does not to be handled. We also use the fact that, in the binary case, at most only [2 times pbin/4]=[2 times 53/4]=27 partial products need to be reduced and hence only a portion of the tree needs to be shared between the binary and decimal multiplication. The split reduction tree for this design point is illustrated by FIG. 6. The number of 4:2 and 3:2 counters and doublers is dependent upon the number of 4-bit decimal or binary values to be reduced down to 2, 4-bit decimal or binary values, while containing the maximum number of 3:2 counters before the counter tree is split into a binary multiplier unique portion and a decimal multiplier unique portion.

The combined decimal/binary multiplier can reduce the maximum of 33, 4-bit decimal or binary values with a partial product selection circuit capable of receiving 33, 4-bit values, each value representing a BCD-4221 digit or a 4-bit binary integer, and a selection signal to indicate the type of data received. The partial product selection circuit in combination with a split 33:2 selection tree outputs 2, 4-bit values of the respective input type a combination of counters including 3:2 counters and decimal doublers in a decimal unique portion of the partial product reduction tree.

Results Analysis

First, examining the results for the worst-case columns from the original and proposed reduction tree found in Table II, it is easy to see that the proposed reduction trees offer significant area advantages, up to a 29% savings in area. This is primarily due to the reduction in the number of binary/decimal doubling units from the original tree in Vazquez et al 2007. Our improved tree from FIG. 4 also improves delay by about 2.6%. This minor improvement is most likely due to the fact that the binary 3:2 CSAs set the critical path delay and hence the improved doubling units do not help improve the critical path delay as much. The results for the two split tree designs show a large improvement in the critical path delay of nearly 50% for the binary multiplication over the fully shared design. This comes at only a slight increase in area and decimal critical path delay of this design, making the split tree of our designs the most attractive reduction trees. The delay penalty on the decimal path is most likely due to the additional fan-out of the shared portion of the tree.

The synthesis results for the fully pipelined multiplier designs are given in Table III. All the designs listed in the table are pipelined for a clock cycle of 500 ps or 16 FO4 and hence only latency in clock cycles is reported in the table. From these results, we can draw several conclusions. First, as compared to our baseline separate binary and decimal multiplier designs, the combined binary/decimal designs give significant area savings. The previous design presented in Vazquez et al 2007 has an area savings of 24% over separate multipliers. The proposed designs offer additional savings of up to 42% over using separate multipliers. In addition, the previous design from Vazquez et al 2007 has a significant 3 cycle latency penalty for the binary multiplication as compared to a stand-alone binary multiplier. Our split tree designs allow this latency penalty to be eliminated while still offering an area savings of 36%. The split tree designs significantly reduce the area overhead of adding a decimal multiplier without significantly penalizing the latency of the binary multiplication.

Features of Various Embodiments

The capabilities of the present invention can be implemented in software, firmware, hardware or some combination thereof and as a circuit or method of executing numbers using the circuit described. Program or code material can preferably be encoded in tangible media, such as in an encoded disc or electronic physical memory. Number width can be varied as described.

The Boolean functions for the circuits depicted herein are just examples. There may be many variations to these diagrams or the steps (or operations) described herein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow.

As a feature of the preferred embodiment, now one can provide a doubler circuit for a binary multiplier, comprising: a BCD doubler circuit, a Binary Coded Decimal formatted encoding, which has bits weighted by 4, 2, 2 and 1, called BCD-4221, used for selection encoding, in which BCD-4221 combinations are valid decimal numbers between 0 and 9, and including a selection signal circuit, which through selection doubles a binary integer number.

The doubler circuit, besides being used for BCD-4221 digits, the doubler circuit is used for combined BCD-4221 and binary multiplication in a combined decimal and binary multiplier.

The doubler circuit forms part of a combined BCD-4221 and binary multiplier which receives data as a 4-bit value, said value representing a BCD-4221 digit or a 4-bit binary integer, and a selection signal indicates the type of data.

A carry output of the doubler circuit is a 1-bit carry out and a 4-bit BCD-4221 digit or a 4-bit binary integer equal to the double of the input.

The carry out is equal to 10 when the 4-bit output is a BCD-4221 digit and 16 when it is a binary integer.

The doubler circuit provides an overall logic function to realize the doubling through the integration of the selection signal into a logic generated output bit.

The doubler circuit has a multiplexer which is folded into the logic to perform decimal doubling. And the doubler circuit also provides binary doubling logic which uses a wired shift circuit. So, the doubler circuit of decimal and binary doubling logic is shared in the output.

To perform decimal doubling the doubler circuit logic using the nultiplexer for a two-level function.

More generally, in the preferred embodiment the invention will be used in a computer system having a data processor having a multiplier circuit for binary multiplication, and the method of processing numbers of a defined width via a BCD doubler circuit will comprise formatting numbers to be processed with a Binary Coded Decimal formatted encoding, which has bits weighted by 4, 2, 2 and 1, called BCD-4221, used for selection encoding, in which BCD-4221 combinations are valid decimal numbers between 0 and 9, and executing specific data identified with a selection signal circuit, which BCD doubler through selection doubles a binary integer number.

This computer system BCD doubler besides being used for BCD-4221 digits will be used for combined BCD-4221 and binary multiplication in a combined decimal and binary multiplier.

This doubler circuit forms part of a combined BCD-4221 and binary multiplier which receives data as a 4-bit value, said value representing a BCD-4221 digit or a 4-bit binary integer, and a selection signal is employed to indicate the type of data.

The doubler circuit provides a carry output as a 1-bit carry out and either a O-bit BCD-4221 digit or a 4-bit binary integer equal to the double of the input.

This carry output is equal to 10 when the 4-bit output is a BCD-4221 digit and 16 when it is a binary integer.

The doubler circuit provides an overall logic function to realize the doubling through the integration of the selection signal into a logic generated output bit.

This doubling circuit has its multiplexer folded into the logic to perform decimal doubling. A wired shift circuit is used in both decimal and binary doubling of numbers. Thus decimal and binary doubling shares an output. A two level function is used to perform decimal doubling using said multiplexer.

As a feature of an alternative embodiment generally we would provide a counter tree for a decimal multiplier which comprises a partial product reduction tree including 3:2 Carry Save Adders as counters, and doublers for doubling multiplication of BCD numbers.

This counter tree is a partial product reduction tree having a reduced logic counter tree used as a decimal multiplier, said decimal multiplier being a 16 digit decimal multiplier for BCD-4221 digits comprising 3:2 counters and BCD-4221 doublers.

This decimal multiplier of the counter tree is also used to perform 64 bit binary unsigned integer multiplication.

The number of employed 3:2 counters and doublers for multiplication is varied dependent upon the number of 4-bit decimal or binary values to be reduced down to 2, 4-bit decimal or binary values.

The counter tree is coupled to a receiver for providing up to 33, 4-bit decimal or binary values in multiplier input, and has ports for receiving 33, 4-bit value data representing a BCD-4221 digit or a 4-bit binary integer, and a selection signal circuit to indicate the type of data, and as a result of the logic function the combined decimal/binary multiplier data provides output of 2, 4-bit values of the respective input type after data passes through said partial product reduction tree, with the arrangement of 3:2 counters and doublers forming a logic function of 3:2 counters and doublers used to reduce 4-bit decimal or binary values of data in a partial product array.

In this counter tree unsigned binary numbers when multiplied would give an incorrect result if the last recorded sign digit is negative but for an additional partial product added to the reduction tree.

Here a 3:2 Carry Save Adder corrects an extra partial product of the partial product reduction tree caused when the multiplication output has a one in the most significant bit.

The counter's reduction tree uses only binary 3:2 CSAs and binary doubling units at the top of the counter's reduction tree.

Booth recoding is used to recode the multiplier operand during binary multiplication, and a single 3:2 CSA is employed in the reduction tree to correct an extra partial product of the partial product reduction tree caused when the multiplication output has a one in the most significant bit.

In this alternative embodiment of a computer system having a data processor having a multiplier circuit for multiplication, processing numbers of a defined width via a counter tree for a decimal multiplier is performed, including a partial product reduction tree including 3:2 Carry Save Adders as counters, and doublers for doubling multiplication of BCD numbers.

Here the counter tree is a partial product reduction tree having a reduced logic counter tree used as a decimal multiplier, said decimal multiplier being a 16 digit decimal multiplier for BCD-4221 digits comprising 3:2 counters and said doublers.

This decimal multiplier is also used to perform 64 bit binary unsigned integer multiplication.

In this process of multiplication the number of employed 3:2 counters and doublers for multiplication is varied dependent upon the number of 4-bit decimal or binary values to be reduced down to 2, 4-bit decimal or binary values.

The counter tree is coupled to a receiver for providing up to 33, 4-bit decimal or binary values in multiplier input, and has ports for receiving 33, 4-bit value data representing a BCD-4221 digit or a 4-bit binary integer, and a selection signal circuit to indicate the type of data, and as a result of the logic function the combined decimal/binary multiplier data provides output of 2, 4-bit values of the respective input type after data passes through said partial product reduction tree, with the arrangement of 3:2 counters and doublers forming a logic function of 3:2 counters and doublers used to reduce 4-bit decimal or binary values of data in a partial product array.

Here, remember, unsigned binary numbers when multiplied would give an incorrect result if the last recorded sign digit is negative but an additional partial product is added to the reduction tree for correcting said result.

The counter tree's 3:2 Carry Save Adder corrects an extra partial product of the partial product reduction tree caused when the multiplication output has a one in the most significant bit.

The counter tree's reduction tree uses only binary 3:2 CSAs and binary doubling units at the top of the tree.

Booth recoding is used to recode the multiplier operand during binary multiplication, and a single 3:2 CSA is employed in the reduction tree to correct an extra partial product of the partial product reduction tree caused when the multiplication output has a one in the most significant bit.

Here also, the width of the number being multiplied is determined by a chosen width of bits of the multiplier.

As a feature of still another alternative embodiment, we have provided a combined decimal binary multiplier which comprises a fixed point multiplier having a first 64 bit value input into respective decimal and binary multiplier generators, a nultiplexer bank for a partial product selector, and an separate input for a decimal radix05 BCD-4221 Booth recording element and binary Radix-4 recording element also supplying multiplexed output to said partial product selector; and the partial product selector for multiplication including doubling circuits for doubling multiplication and having its output supplied to a split 33:2 partial product reduction tree having a separate binary and decimal output, each supplying a 128 bit conditional quaternary tree adder performing a final carry propagate addition for binary and decimal output.

Now in this embodiment, the multiplier has a 3:2 Carry Save Adder to correct an extra partial product of the partial product reduction tree caused when the multiplication output has a one in the most significant bit. The reduction tree employs 3:2 CSAs for decimal compression. This multiplier has a doubling unit which uses BCD-4221 encoding. A fixed binary 64-bit operation performs unsigned binary multiplication. In this multiplier a quaternary adder is used with a BCD-4221 to BCD-8421 conversion for output from the multiplier.

In this multiplier a binary output shares only a top half of the reduction tree and the lower half is split before any doubling units are used. And here redundant BCD-4221 encoding is used for the doubling units.

Thus for this alternative embodiment a combined decimal binary multiplier, comprises a partial product selection unit, and a receiver for decimal and binary values, a decimal and binary recoding unit, and a partial product selection signal circuit providing BDC-4221 decimal values and binary values to said partial product selection unit, and also a split partial product reduction logic unit for decimal and binary multiplication having a counter tree split into decimal and binary unique portions to separate the last few stages of a combined 16 digit BCD-4221 decimal multiplier from a 64 bit unsigned binary integer multiplier of said combined decimal binary multiplier.

This combined decimal binary multiplier has a binary multiplier with unique portion which has 4:2 and 3:2 counters and wire shifts for multiplication while said decimal multiplier has 3:2 counters and BCD-4221 doublers in a unique decimal portion, with a final carry propagate adder split to each format. This combined decimal binary multiplier can reduce the maximum of 33, 4-bit decimal or binary values with a partial product selection signal circuit capable of receiving 33, 4-bit values, each value representing a BCD-4221 digit or a 4-bit binary integer, and wherein said selection circuit provides a selection signal to indicate the type of data received.

Its partial product selection circuit in combination with a split 33:2 selection tree outputs 2, 4-bit values of a respective decimal or binary input type with a combination of counters including 3:2 counters and decimal doublers in a decimal unique portion of the partial product reduction tree.

In this embodiment of a computer system having a data processor having a multiplier circuit for binary multiplication, the method of processing numbers of a defined width via a combined decimal/binary multiplier includes, for a fixed point multiplier, generating a first 64 bit value input for respective decimal and binary multiplier generators, and providing a partial product selector for a multiplexer ban with separate input for a decimal radix05 BCD-4221 Booth recording element and binary Radix-4 recording element also supplying multiplexed output to said partial product selector; utilizing for multiplication said partial product selector and using doubling circuits for doubling multiplication, said partial product selector supplying its intermediate output to a split 33:2 partial product reduction tree having a separate binary and decimal output, each supplying a 128 bit adder performing a final carry propagate addition for binary and decimal output.

The multiplier has a 3:2 Carry Save Adder correcting an extra partial product of the partial product reduction tree caused when the multiplication output has a one in the most significant bit. The reduction tree employs 3:2 CSAs for decimal compression. And, again, here a decimal doubling unit uses BCD-4221 encoding.

A fixed binary 64-bit operation performs unsigned binary multiplication.

A quaternary adder is used with a BCD-4221 to BCD-8421 conversion for output from the multiplier.

A binary output shares only a top half of the reduction tree and the lower half is split before any doubling units are used.

And this embodiment, in the particular split t partial product reduction logic unit for decimal and binary multiplication employs a counter tree split into decimal and binary unique portions to separate the last few stages of a combined 16 digit BCD-4221 decimal multiplier from a 64 bit unsigned binary integer multiplier of said combined decimal binary multiplier.

These claims should be construed to maintain the proper protection for the invention first described.

TABLE I

BCD-8421 AND BCD-4221 CODINGS

| DECIMAL | BCD-8421 | BCD-4221 |
|---|---|---|
| 0 | 0000 | 0000 |
| 1 | 0001 | 0001 |
| 2 | 0010 | 0010 OR 0100 |
| 3 | 0011 | 0011 OR 0101 |
| 4 | 0100 | 0100 OR 0110 |
| 5 | 0101 | 1001 OR 0111 |
| 6 | 0110 | 0110 OR 1100 |
| 7 | 0111 | 0111 OR 1101 |
| 8 | 1000 | 1110 |
| 9 | 1001 | 1111 |

TABLE II

SYNTHESIS RESULTS FOR WORST-CASE COLUMN IN REDUCTION TREE DESIGNS

| TREE DESIGN | BIN/DEC DELAY | | AREA | |
|---|---|---|---|---|
| | F04 | RATIO | μm² | RATIO |
| 64-BIT/16 DIG ORIG. TREE [9] | 34.2 | 1.00 | 6,130 | 1.00 |
| 64-BIT/16 DIG IMPROVED TREE | 33.3 | 0.97 | 4,375 | 0.71 |
| 64-BIT/16 DIG SPLIT TREE | 19.6/34.5 | 0.58/1.01 | 4,951 | 0.81 |
| 53-BIT/16 DIG SPLIT TREE | 17.5/35.3 | 0.52/1.03 | 4,354 | 0.71 |

TABLE III

SYNTHESIS RESULTS FOR VARIOUS MULTIPLIER DESIGNS

| MULT DESIGN | LATENCY | | AREA | |
|---|---|---|---|---|
| | BIN | DEC | μm² | RATIO |
| 64-BIT BIN CSA | 5 | — | 76,973 | — |
| 53-BIT BIN CSA | 5 | — | 53,274 | — |
| 116-DIG RADIC-5 DEC [9] | — | 8 | 99,911 | — |
| 64-BIT/16-DIG BASELINE | 5 | 8 | 176,884 | 1.00 |
| 53-BIT/16-DIG BASELINE | 5 | 8 | 153,635 | 1.00 |
| ORIG. 64-BIT/16-DIG [9] | 8 | 8 | 135,184 | 0.76 |
| IMPROVED 64-BIT/16-DIG | 8 | 8 | 101,229 | 0.57 |
| SPLIT 64-BIT/16-DIG | 5 | 8 | 112,952 | 0.64 |
| SPLIT 53-BIT/16-DIG | 5 | 8 | 104,789 | 0.68 |

What is claimed is:

1. A combined binary decimal multiplier comprising:
a plurality of binary multiple generators configured to receive a first input and to generate a first output based on the first input;
a plurality of binary recording elements configured to receive a second input and to generate a second output; based on the second input;
a partial product selector having an binary decimal doubling unit configured to receive the first output and the second output and to generate a third output;
a split 33:2 partial product reduction tree configured to receive the third output and to generate a binary output and a decimal output, the split 33:2 partial product reduction tree comprising a plurality of 3:2 carry save adders; and
a 128 bit combined binary/decimal conditional quaternary tree adder configured to perform carry-propagate addition of the binary output and the decimal output.

2. The combined binary decimal multiplier of claim 1 wherein the binary decimal doubling unit is configured to use BCD-4221 encoding for binary multiplication.

3. The combined binary decimal multiplier of claim 1 wherein, the binary decimal doubling unit receives data as a 4-bit value, said value representing a BCD-4221 digit or a 4-bit binary integer, and a selection signal indicates the type of data.

4. The combined binary decimal multiplier of claim 1 wherein the split 33:2 partial product reduction tree is configured to reduce latency of the binary output by sharing a top half of the split 33:2 partial product reduction tree.

5. The combined binary decimal multiplier of claim 1 wherein the split 33:2 partial product reduction tree does not include a 4:2 compressor.

6. A method for performing combined binary decimal multiplication comprising:
receiving a first input by a binary multiple generator;
generating a first output based on the first input by the binary multiple generator;
receiving a second input by a binary recording element;
generating a second output based on the second input by the binary recording element;
receiving the first output and the second output by a partial product selector;
generating a third output by the partial product selector based on the first output and he second output;
receiving the third output by a split 33:2 partial product reduction tree, the split 33:2 partial product reduction tree comprising a plurality of 3:2 carry save adders;
generating a binary output and a decimal output by the split 33:2 partial product reduction tree based on the third output; and
performing carry-propagate addition of the binary output and the decimal output by a 128 bit combined binary/decimal conditional quaternary tree adder.

7. The method for performing combined binary decimal multiplication of claim 6 wherein the binary decimal doubling unit is configured to use BCD-4221 encoding for binary multiplication.

8. The method for performing combined binary decimal multiplication of claim 6 wherein, the binary decimal doubling unit receives data as a 4-bit value, said value representing a BCD-4221 digit or a 4-bit binary integer, and a selection signal indicates the type of data.

9. The method for performing combined binary decimal multiplication of claim 6 wherein the split 33:2 partial product reduction tree is configured to reduce latency of the binary output by sharing a top half of the split 33:2 partial product reduction tree.

10. The method for performing combined binary decimal multiplication of claim 6 wherein the split 33:2 partial product reduction tree does not include a 4:2 compressor.

* * * * *